Aug. 16, 1927.  
M. J. WEBER  
WEIGHING SCALE  
Filed Oct. 22, 1923  
1,639,120  
2 Sheets-Sheet 1
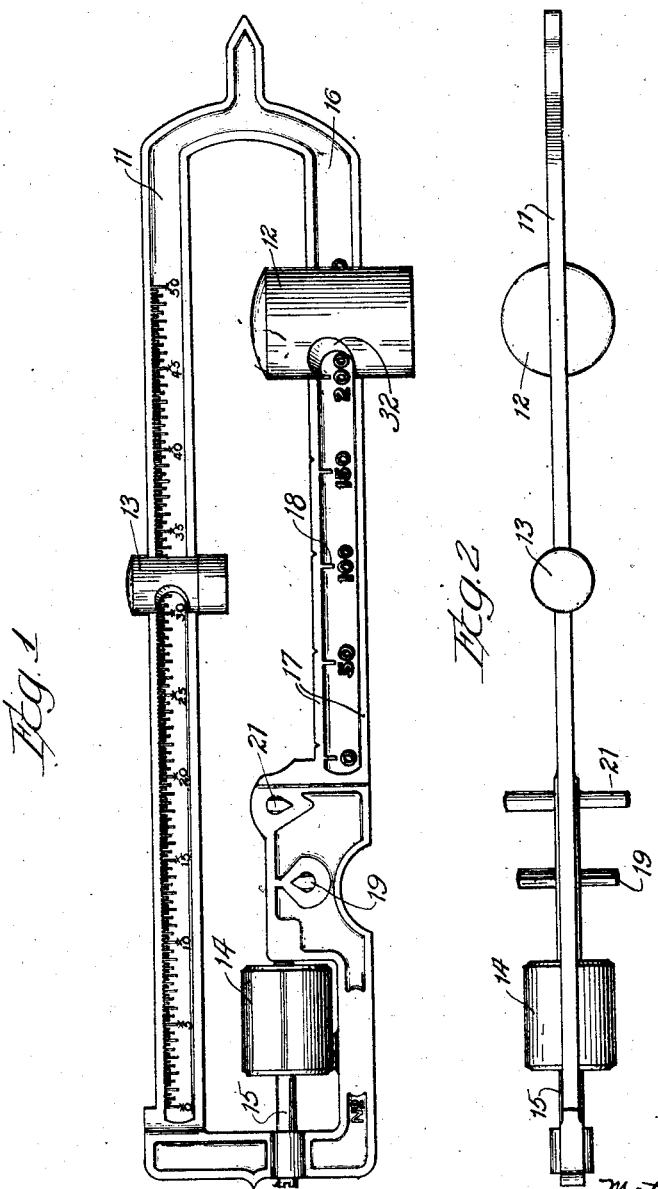

Aug. 16, 1927.
M. J. WEBER
WEIGHING SCALE
Filed Oct. 22, 1923
2 Sheets-Sheet 2
1,639,120
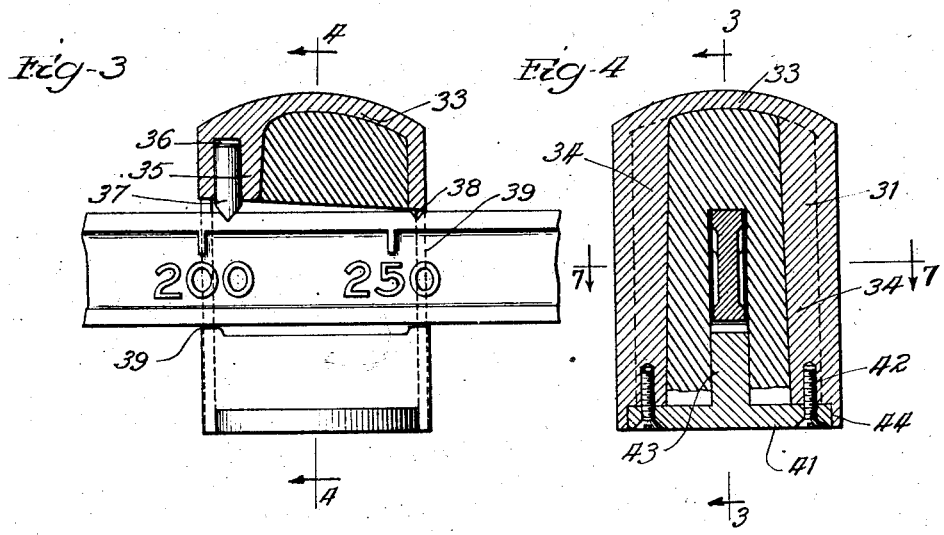
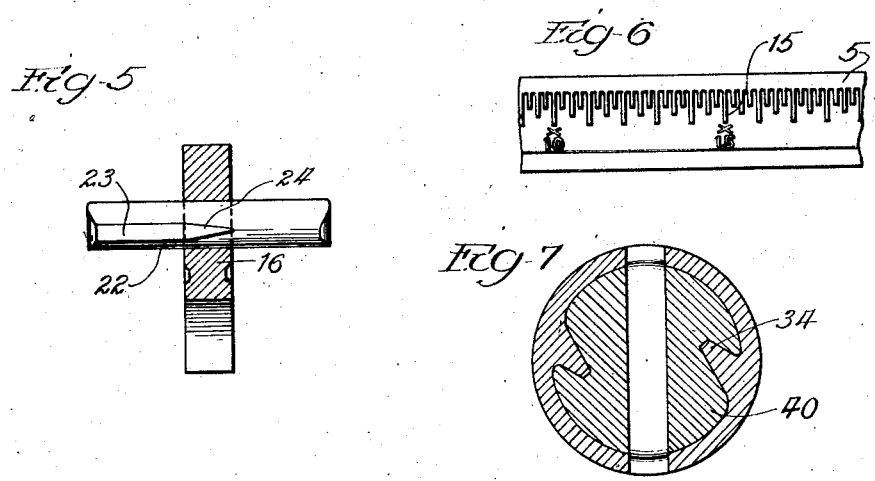

Patented Aug. 16, 1927.

1,639,120

UNITED STATES PATENT OFFICE.

MATHIAS J. WEBER, OF CHICAGO, ILLINOIS, ASSIGNOR TO CONTINENTAL SCALE WORKS, OF CHICAGO, ILLINOIS, A CORPORATION OF ILLINOIS.

WEIGHING SCALE.

Application filed October 22, 1923. Serial No. 670,105.

This invention relates in general to scale beams and slide weights therefor, and to the process of manufacturing the same.

A principal object of the present invention is the provision of a scale beam of extreme accuracy and of improved, pleasing appearance.

A further object of the invention is the provision of a scale beam of die-cast material.

Another important object of the invention is the provision of a slide weight of improved appearance and extreme accuracy and which may be made of die-cast metal.

Another important object of the invention is the cheapening, without sacrifice of accuracy, durability or appearance, of the scale beam and its parts.

Another important object of the present invention is the provision of a slide weight so constructed that cooling and consequent contraction of the lead or other filler will bind the two firmly and permanently together.

Numerous other objects and advantages of the invention will be apparent as it is better understood from the following description, which, taken in connection with the accompanying drawings, discloses a preferred embodiment thereof.

On the drawings,

Figure 1 is a side elevation of the scale beam and attendant parts embodying my invention;

Fig. 2 is a top plan view thereof;

Figs. 3 and 4 are sections taken respectively substantially on the lines 3—3 and 4—4 of Fig. 4 and 3;

Fig. 5 is a section taken through the scale beam at a knife edge member;

Fig. 6 is an enlarged section of the scale beam showing the scale graduations or indicia; and Fig. 7 is a section taken substantially on the line 7—7 of Fig. 4.

Referring to the drawings, reference character 11 indicates the scale beam proper. Reference character 12 indicates the large slide weight, weighing in units of fifty pounds (in the present instance) and reference character 13 the small slide weight weighing in units of one-quarter pounds. Reference character 14 indicates the adjusting weight held in place in the beam by the adjusting screws 15.

The scale beam in the present instance is provided with a depressed channel 16 throughout its upper and lower lengths and around the recess 16 is provided raised flat marginal edges 17. The graduations are provided in relief, as indicated at 18. The scale beam is preferably die-cast and these indica are provided in the dies for the making of the beam. In the making of the beam, in the present instance, the knife edges 19 and 21 are inserted in the dies so that the material of the beam is cast about them. They have flattened tapered sides, as indicated at 22 in Fig. 5, so that they may be driven out by a light blow of a hammer after the beam is formed to permit finishing, plating, etc., of the beam and thereafter reinserted into the same opening and driven into sufficiently tight engagement to hold them in place. The knife edges are preferably flattened to parallel planes throughout a part of the length at 23 and are then given a sharp taper at 24. This prevents the material of the beam from running out along the pivots and insures accuracy of replacement. The taper given is or may be provided in a milling machine by providing correspondingly shaped cutters. This provides absolute accuracy and, in effect, the casting of the beam with the knife edges in place.

Figs. 3 and 4 show a preferred form of slide weight, which is also die-cast and which eliminates, by reason of its construction, many of the operations required prior to my invention to provide this member.

The slide weight of Figs. 3 and 4 comprises a body 31 having an outer cylindrical surface cut away at the front to provide the reading recess 32. This body is closed at the top by an integral wall 33 and has at each side inwardly extending parts 34 extending throughout the length of the body at these points. At the front and above the recess 32 a boss 35 is formed within the body to provide the recess 36 for the locking knife edge or dog 37 which is adapted to enter into the notches 38 customarily provided in the scale beam. The body is slotted at opposite sides at 39 to permit it to straddle or be slid down over the scale beam.

The inwardly extending parts or ribs 34 are so constructed and arranged that cooling and consequent shrinkage of the lead filler 40 will bind thereon. This is accomplished in the present instance by arranging the ribs angularly as in Fig. 7.

It is necessary that this slide weight have accurate predetermined weight and in accordance with the usual custom it is filled with lead or other material. This body provides an internal recess of desired capacity into which molten lead may be poured in exact predetermined amount to give the necessary balancing effect to provide scale accuracy. The bottom of the weight is provided with a plate 41 through which screws or other fastening members 42 are arranged into the inward projections 34, already described. A tongue, or extension, 43 is provided upon the plate 41 to enter up into the slots 39 of the body to close these beneath the beam. The plate is or may be let into the bottom, as indicated at 44 in Fig. 4. The construction of this slide weight is such that it may be die-cast, permitting removal of the male die readily in the separation of the mold. The outer surface as it meets the eye of a person upon the scale is of one-piece which is, of course, polished to present a pleasing appearance. The bottom plate 41 may also be die-cast, of course, and the whole weight, except for the counter-balancing lead, or other material, may be die-cast. The structure of this weight eliminates the necessity for accurately threading two parts of the slide weight to permit their fitting together in accordance with the practice generally employed prior to my invention.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A scale beam, comprising a die-cast body having weighing indicia thereon, a knife edge positioned in said body prior to casting and having flattened tapered sides permitting temporary removal of the knife edge from the casting to permit machining, plating and the like and re-insertion thereof effecting tight frictional engagement.

2. A scale beam, comprising a die-cast body having weighing indicia thereon in relief, a knife edge positioned in said body during casting operation and temporarily removable therefrom after casting to permit machining, plating and the like.

3. A slide weight for a scale beam, comprising, a one-piece body having internal recesses opening at one end of the weight whereby said body is adapted to be formed in a mold and withdrawn therefrom, one of said recesses being adapted to receive the weight determining material.

4. A slide weight for a scale beam, comprising, a body for receiving the weight determining material, and slotted to straddle the scale beam, and a plate having a part adapted to be secured to the bottom of said body and having a part entering into the slot in the body beneath said beam.

5. A slide weight for a scale beam, comprising, a body slotted to straddle the scale beam and adapted to receive the weight determining material, a plate arrangeable at the bottom of said body, and fastening members adapted to be disposed through said plate and into said body for securing the parts together.

6. A slide weight, comprising a one-piece hollow body adapted for the reception of weight determining material, and means located within the body for tight interlocking relation with said weight determining material upon shrinkage of the latter.

7. A slide weight, comprising a one-piece body, weight determining material therein contracting after insertion, and connections between said weight determining material and said body for tightly holding said weight determining material after contraction.

8. A scale beam, comprising, a cast body, a knife edge positioned in said body during casting operation and temporarily removable therefrom after casting to permit machining, plating and the like.

9. The process of making a scale beam, which comprises, casting the same with the knife edges in place, removing the knife edges after casting, finishing the scale beam, and returning the removed knife edges to position.

10. A scale beam, comprising a cast body, a knife edge positioned in said body prior to casting and having flattened tapered sides permitting temporary removal of the knife edge from the casting to permit machining, plating and the like and re-insertion thereof effecting tight frictional engagement.

MATHIAS J. WEBER.